No. 777,528. PATENTED DEC. 13, 1904.
J. MEEHAN.
OIL SUPPLY INDICATOR.
APPLICATION FILED APR. 11, 1904.
NO MODEL.
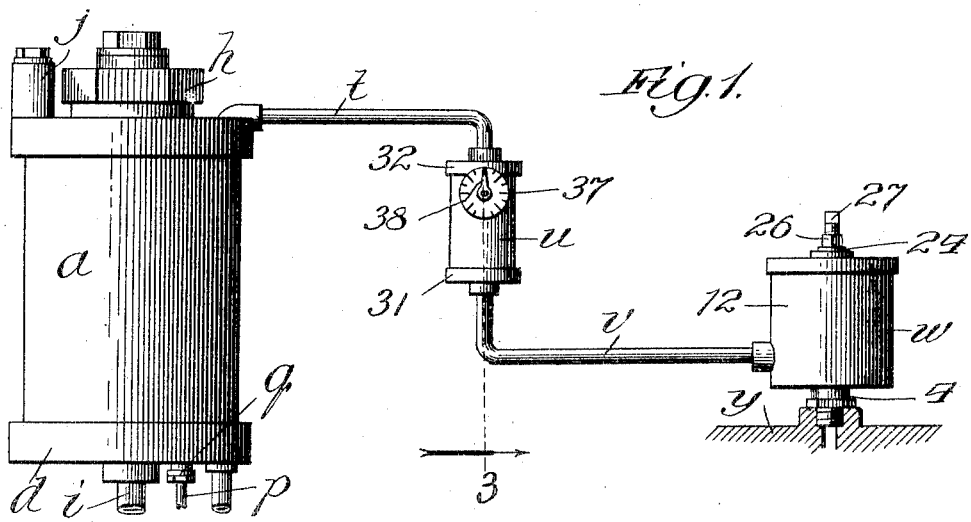
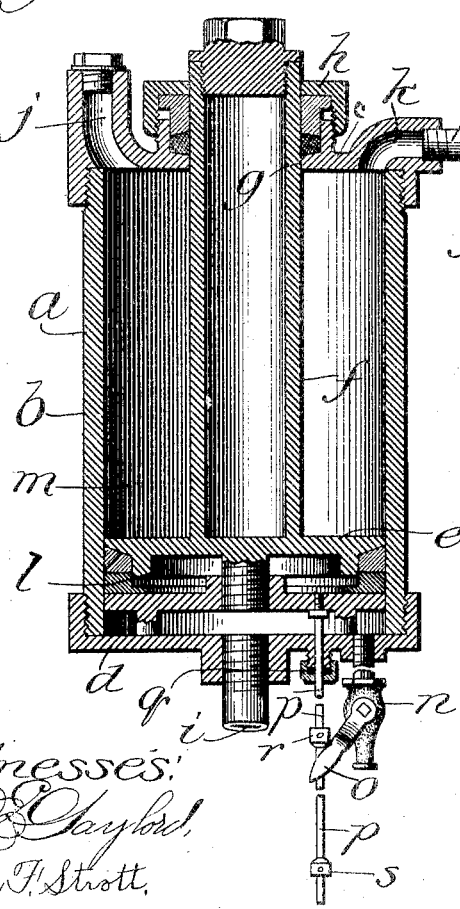
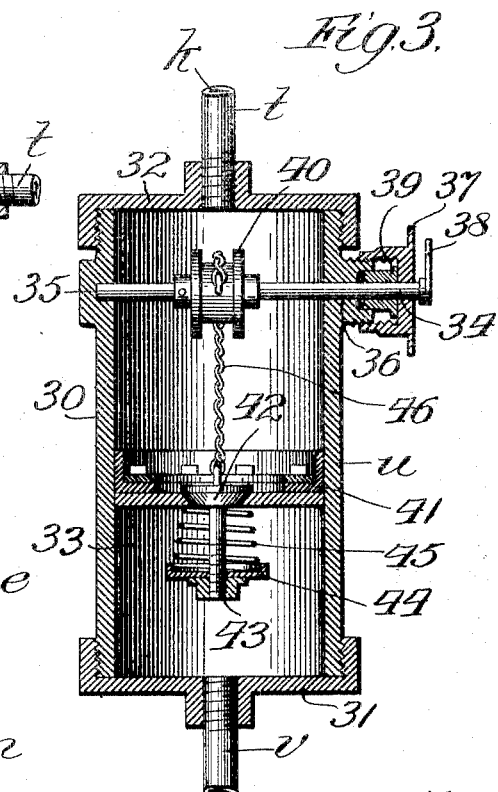
Witnesses:
Chas. E. Gaylord
Harry F. Strott
Inventor:
James Meehan,
By Thomas F. Sheridan,
Atty.

No. 777,528. Patented December 13, 1904.

UNITED STATES PATENT OFFICE.

JAMES MEEHAN, OF ST. CHARLES, ILLINOIS.

OIL-SUPPLY INDICATOR.

SPECIFICATION forming part of Letters Patent No. 777,528, dated December 13, 1904.

Original application filed December 24, 1903, Serial No. 186,434. Divided and this application filed April 11, 1904. Serial No. 202,664. (No model.)

*To all whom it may concern:*

Be it known that I, JAMES MEEHAN, a citizen of the United States, residing at St. Charles, in the county of Kane and State of Illinois, have invented certain new and useful Improvements in Oil-Supply Indicators, of which the following is a specification.

The matter herein shown and described, but not claimed, is contained in an application for Letters Patent of the United States filed by me on the 24th day of December, 1903, Serial No. 186,434, for improvements in automatic lubricators, of which this is a divisional application.

My invention relates to that class of oil-supply indicators adapted to be used in connection with an oil-supply reservoir for indicating the amount of oil passing therethrough.

It relates particularly to an oil-supply indicator having a casing forming a passage or chamber having inlet and outlet openings, a dial, and an indicator-hand movable with relation to such dial and provided with means whereby such indicator-hand is moved by the oil passing through such passage or chamber, so that the quantity of oil passing through may be determined by observing the movement of the indicator-hand during a given time.

It relates, further and particularly, to the piston mechanism mounted inside of the casing and to the means for operatively connecting such piston mechanism with the indicator-hand, whereby the movement of the oil will when desired cause a corresponding movement of the piston and indicator-hand and allow the oil to pass through the indicator without affecting the indicator-hand when desired.

The principal object of the invention is to provide a simple, economical, and efficient oil-supply indicator.

A further object of the invention is to provide an oil-supply indicator adapted to be used in connection with an oil-supply reservoir and an automatic lubricator for indicating the amount of oil passing from such reservoir and through the lubricator during any given time.

A further object of the invention is to provide an oil-supply indicator having a suitable dial and indicator-hand with means whereby such indicator-hand may be moved by the oil passing through the indicator proportionately to the passage of such oil.

A still further object of the invention is to provide in connection with an oil reservoir and lubricator an indicator for showing the amount of oil passing from such reservoir and supplied to the indicator and means for indicating when the oil-reservoir is empty.

Other and further objects of the invention will appear from an examination of the drawings and the following description and claims.

My invention consists in the features, combinations, and details of construction hereinafter described and claimed.

In the accompanying drawings, Figure 1 is a view in elevation of an automatic lubricator and reservoir provided with an oil-supply indicator constructed in accordance with my improvements; Fig. 2, a sectional elevation of the reservoir, and Fig. 3 a sectional elevation of the indicator.

In constructing an oil-supply indicator in accordance with my improvements and using it in connection with a reservoir and automatic lubricator I provide a reservoir $a$, comprising an outer cylindrical casing $b$, having an upper head $c$ and a lower head $d$. A differential piston $e$ is slidably mounted in the chamber formed by such casing, having a central tubular portion $f$, slidably mounted in an axial opening $g$ in the upper head and provided with a suitable packing-box $h$. This differential piston, as will be seen from an inspection of Fig. 2, is mounted intermediate the steam-inlet passage $i$, which communicates with the steam-dome of a locomotive-engine (not shown) and the oil-inlet passage $j$ and oil-outlet passage $k$. The piston thus forms, in connection with the casing, a steam or pressure chamber $l$ on the lower side thereof and an annular oil-chamber $m$ on the upper side. The superficial area of the piston on the lower or steam side is thus greater than the area of such piston on the side which forms the oil-chamber, and the pressure in the oil-chamber is therefore greater than that in the steam-chamber. It is of course well known that the pressure in the valve-chest is substantially equal to that in the steam-dome of an engine, and it will therefore be readily seen that when the oil-outlet passage communicates with the valve-chest the oil will be forced into such chest notwithstanding the pressure of the steam therein.

In order to provide means whereby the operator may be made aware that the oil-chamber of the reservoir is empty when all of the oil has been forced therefrom, I provide a hissing-cock $n$, having a passage communicating with the steam-chamber of the reservoir and provided with an operating-lever $o$. A suitable rod $p$ is mounted in the piston, movable therewith and extending out through the lower head of the reservoir through a suitable packing-box $q$, in which it is slidably mounted. The outer portion of this rod is provided with a shoulder or collar $r$, adapted to engage the operating-lever of the hissing-cock and close it when the rod and piston are in their lower position, as shown in Fig. 2. The rod is also provided with a similar collar or shoulder $s$ below the operating-lever of the hissing-cock, adapted to move such lever upward from the position shown in Fig. 2 to open the cock when the piston is in its upper position and the oil-chamber empty or substantially empty.

The oil-outlet passage or channel $k$ communicates with the valve-chest and extends through a pipe $t$, indicator $u$, pipe $v$, valve-casing $w$, and wall of the valve-chest $y$.

It is also very desirable that means be provided whereby the quantity of oil which is being used may be determined at any time. In order to accomplish this, an indicator $u$, above mentioned, is provided, formed of a casing 30, having a lower base portion 31 and an upper cap 32, forming an inner oil-chamber 33, such casing being mounted intermediate the pipes $t$ and $v$, above described, and forming in connection therewith a continuous passage for the oil from the oil-reservoir. A suitable shaft 34 is rotatably mounted in this casing near its upper end in suitable bearings 35 and 36. One end of this shaft extends out through a suitably-graduated dial 37, and a hand 38 is mounted on its outer end and rotatable therewith, a stuffing-box 39 being of course provided for preventing the escape of oil. A pulley 40 is mounted inside the casing on this shaft rotatable therewith, and a piston 41 is provided having a valve 42, seated in an axial perforation which extends through such piston, such valve being provided with a depending stem 43, having a head 44 at its lower end, and a spiral spring 45 is mounted intermediate such head and the lower side of the piston. A suitable chain 46 is mounted upon and connected to the pulley and has its lower end attached to the valve of the piston. The superficial area of the piston is greatly in excess of the area of the valve, and the spring which is mounted beneath the piston is sufficiently pliable, so that it will not hold the valve to its seat when pressure is applied above the piston after the chain has reached its downward limit of motion. This spring will, however, hold the valve to its seat during the movement of the piston and the unwinding of the chain, and only during such movement. By this arrangement it will be readily seen that when it is desirable to ascertain the quantity of oil being used the piston may be moved to its uppermost position by turning shaft 34 and its pulley backward by means of the hand 38, thus winding up the chain, and that when it is in this position the pressure of the oil above the piston will cause the piston to move downward as rapidly as the oil escapes from beneath it. The indicator-hand moves correspondingly around the dial, so as to indicate the distance the piston has traveled, and consequently the amount of oil which has passed during the movement of the piston, which may be timed. When the valve has reached its lowermost position, so that the chain refuses to allow it to descend farther, the piston will be pressed downward still farther against the spring sufficiently to unseat the valve and permit a constant flow of oil through the piston when in its lowered position. In other words, oil will pass through the piston constantly as used, except during the interval of time when the chain is being unwound and the indicator-shaft rotated, and during this interval it moves with the piston, but not through it. Therefore, the dimensions of the oil-chamber being known, the quantity of oil used may be readily determined by the movement of the hand upon the dial.

I claim—

1. In an indicator of the class described, the combination of a casing provided with an inner chamber having inlet and outlet openings, a piston movably mounted in such chamber intermediate such inlet and outlet openings, a rotatable shaft extending into such chamber, an indicator-hand mounted upon such shaft and rotatable therewith, and chain mechanism connecting such piston and shaft, substantially as described.

2. In an indicator of the class described, the combination of a casing provided with an inner chamber having inlet and outlet openings communicating with a suitable source of oil-supply and with the mechanism to be lubricated respectively, an indicator-hand, a piston movably mounted in such chamber having a perforation therethrough, a valve seated in the perforation in such piston, spring mechanism for holding such piston in engagement with the valve, and mechanism connecting such valve and thereby the piston with the indicator-hand, substantially as described.

3. In an indicator of the class described, the combination of a casing provided with an inner chamber having inlet and outlet openings, a piston movably mounted in such chamber intermediate the inlet and outlet openings and provided with a perforation therethrough, a rotary shaft extending into such chamber, an indicator-hand mounted upon such shaft and rotatable therewith, a valve mounted in the perforation in such piston and yieldingly connected thereto, and chain mechanism attached to such shaft and valve, substantially as described.

4. In an indicator of the class described, the combination of a casing provided with an inner chamber having inlet and outlet openings, a piston movably mounted in such chamber intermediate the inlet and outlet openings and provided with a perforation therethrough, a rotary shaft extending into such chamber, an indicator-hand mounted upon such shaft and rotatable therewith, a valve mounted upon such piston and provided with a depending stem, a head mounted at the lower end of such valve-stem, spring mechanism mounted intermediate such head and piston, and chain mechanism connected with the shaft and valve, substantially as described.

5. In an indicator of the class described, the combination of a casing provided with an inner chamber having inlet and outlet openings, a piston movably mounted in such chamber intermediate the inlet and outlet openings and provided with a perforation therethrough, a rotary shaft extending into such chamber and provided with a pulley thereon, an indicator-hand mounted upon such shaft and rotatable therewith, a valve mounted upon such piston and provided with a depending stem, a head mounted at the lower end of such valve-stem, spring mechanism mounted intermediate such head and piston, and chain mechanism connected at one end with the pulley and at the other end with the valve, whereby the passage of the oil through such chamber when the chain is wound up will move the piston and valve together to the lower limit of motion of the valve and produce a corresponding movement on the indicator-hand and permit the passage of the oil between the valve and piston when such valve has reached its lower limit of motion, substantially as described.

JAMES MEEHAN.

Witnesses:
HARRY IRWIN CROMER,
MAUDE DARNELL.